United States Patent
Ribarich et al.

(10) Patent No.: US 7,525,256 B2
(45) Date of Patent: Apr. 28, 2009

(54) HID BUCK AND FULL-BRIDGE BALLAST CONTROL IC

(75) Inventors: Thomas J. Ribarich, Laguna Beach, CA (US); Dana Wilhelm, Temple City, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 11/263,751

(22) Filed: Oct. 28, 2005

(65) Prior Publication Data

US 2006/0113922 A1 Jun. 1, 2006

Related U.S. Application Data

(60) Provisional application No. 60/623,603, filed on Oct. 29, 2004.

(51) Int. Cl.
*H05B 37/02* (2006.01)

(52) U.S. Cl. .................. 315/209 R; 315/291; 315/308

(58) Field of Classification Search ............. 315/209 R, 315/224, 225, 226, 291, 307, 308, 690
See application file for complete search history.

(56) References Cited

U.S. PATENT DOCUMENTS

| | | | | |
|---|---|---|---|---|
| 5,384,518 A * | 1/1995 | Kido et al. | | 315/225 |
| 5,434,474 A * | 7/1995 | Ukita et al. | | 315/128 |
| 5,491,387 A * | 2/1996 | Saito | | 315/307 |
| 5,811,941 A * | 9/1998 | Barton | | 315/307 |
| 5,907,223 A * | 5/1999 | Gu et al. | | 315/247 |
| 6,504,316 B2 * | 1/2003 | Ito et al. | | 315/224 |
| 6,522,089 B1 * | 2/2003 | Duong et al. | | 315/308 |
| 6,552,498 B1 * | 4/2003 | Prasad et al. | | 315/244 |
| 6,583,587 B2 * | 6/2003 | Ito et al. | | 315/308 |
| 6,617,805 B2 * | 9/2003 | Ribarich et al. | | 315/247 |
| 6,809,938 B2 * | 10/2004 | Lin et al. | | 363/17 |
| 6,856,102 B1 * | 2/2005 | Lin et al. | | 315/291 |
| 2003/0080693 A1 * | 5/2003 | Ono et al. | | 315/224 |
| 2003/0206426 A1 * | 11/2003 | Lin et al. | | 363/132 |

(Continued)

FOREIGN PATENT DOCUMENTS

JP 59-60881 4/1984

(Continued)

OTHER PUBLICATIONS

Notice of Reasons for Rejection issued Apr. 15, 2008 and English Language translation.

(Continued)

*Primary Examiner*—Trinh V Dinh
*Assistant Examiner*—Dieu Hien Duong
(74) *Attorney, Agent, or Firm*—Ostrolenk, Faber, Gerb & Soffen, LLP

(57) ABSTRACT

An integrated circuit controls a power converter that includes single stage buck-boost converter and a switching full bridge that may be used to drive an HID lamp. The single stage buck-boost converter reduces the complexity and parts count of the power converter, or electronic ballast, while permitting PFC and DC bus voltage regulation under control of the integrated circuit to maintain constant power on the HID lamp. The integrated circuit simplifies the design of power converters and electronic ballasts in particular, while reducing part count, complexity and cost in conjunction with the single stage buck-boost converter and the full bridge switching circuit.

15 Claims, 14 Drawing Sheets

U.S. PATENT DOCUMENTS

| | | | |
|---|---|---|---|
| 2004/0066153 A1* | 4/2004 | Nemirow et al. | 315/291 |
| 2004/0183473 A1* | 9/2004 | Kamoi et al. | 315/291 |
| 2005/0062432 A1* | 3/2005 | Van Casteren | 315/127 |
| 2006/0087259 A1* | 4/2006 | Fiorello | 315/291 |
| 2006/0097711 A1* | 5/2006 | Brandt | 323/282 |

FOREIGN PATENT DOCUMENTS

| | | |
|---|---|---|
| JP | 6-283288 | 10/1994 |
| JP | 10-294191 | 11/1998 |
| JP | 2000-134940 | 5/2000 |
| JP | 2004-158211 | 6/2004 |
| WO | WO 2004/084585 | 9/2004 |

OTHER PUBLICATIONS

Translation of Brief Description of the Drawings for each cited reference.

Taiwan Office Action received Jul. 24, 2008 in corresponding Taiwan Application No. 94138106 and English Language translation.

* cited by examiner

| FIG.4A | FIG.4B |
|--------|--------|
| FIG.4C | FIG.4D |
| FIG.4E | FIG.4F |

HID BUCK AND FULL-BRIDGE BALLAST CONTROL IC

CROSS REFERENCE TO RELATED APPLICATIONS

The present application is based upon and claims priority of provisional application No. 60/623,603, filed Oct. 29, 2004, incorporated by reference.

BACKGROUND OF THE INVENTION

1. Field of the Invention

The present invention relates to a circuit, and more particularly an integrated circuit, that controls both a buck circuit and a full-bridge ballast circuit in an HID ballast.

2. Prior Art

A typical prior art solution for a High-Intensity Discharge (HID) ballast (FIG. 1) includes a boost PFC stage 10, a buck stage 11 and a full-bridge stage 12. The boost PFC stage 10 performs power factor correction (PFC) and regulates the DC bus output voltage to a typical value of 400VDC. The buck stage 11 controls the amount of current being delivered to the lamp 13 such that the lamp runs at its nominal power level. The full-bridge stage 12 drives the lamp 13 at a low frequency (200 Hz typical) and provides the AC voltage waveform across the lamp 13.

The boost stage 10 is typically controlled with a standard PFC control IC 14, of which several are marketed by various IC manufacturers. The buck stage 11 is controlled by a pulse-width modulation (PWM) IC 15 for controlling the on-time and therefore the amount of current being delivered to the lamp load 13. A standard PWM control IC 15 or discrete control circuitry is traditionally used for this and generates a gate drive signal which is then level-shifted to the buck MOSFET 16 using a standard high-voltage gate-driver IC 17 such as the International Rectifier IR2117. The full-bridge stage 12 is typically controlled using two International Rectifier IR2153 self-oscillating gate driver ICs 18. Discrete control circuitry 19 is typically used to control the full-bridge stage 12 and the PWM IC15 and more specifically performs the following functions:

1) Lamp ignition (on/off control of the ignitor circuit 20)
2) Senses lamp voltage and current
3) Sets the on-time reference for the buck controller 15
4) Detects various lamp fault conditions
5) Provides ignition timing
6) Counts the number of fault events
7) Resets the ballast or turns the ballast off when faults occur or when the fault counter has timed out.

This solution typically requires six or more control ICs resulting in a high component count, large area of PCB board space, high manufacturing costs, and high overall ballast cost. A more elegant solution is desired for integrating as many functions as possible into a single IC to reduce component count, reduce PCB board space, reduce manufacturing costs, reduce overall ballast cost, and increase reliability.

SUMMARY OF THE INVENTION

An electronic ballast for driving a high intensity discharge lamp comprises a buck stage for receiving a DC input voltage and outputting a DC voltage with controlled current, and a full-bridge switching stage for converting the DC output voltage to a switched AC voltage which is capable of driving an HID lamp. A single chip IC controller is coupled to both the buck stage and the switching stage for controlling both the buck stage and the switching stage. The buck stage includes a switch driven by the controller, and the full-bridge stage includes switches also driven by the controller.

Other features and advantages of the present invention will become apparent from the following description of embodiments of invention which refers to the accompanying drawings.

BRIEF DESCRIPTION OF THE DRAWINGS

FIG. 6 is a graph showing IC supply voltage during turn-on;

DETAILED DESCRIPTION OF EMBODIMENTS OF THE INVENTION

Figure 1:
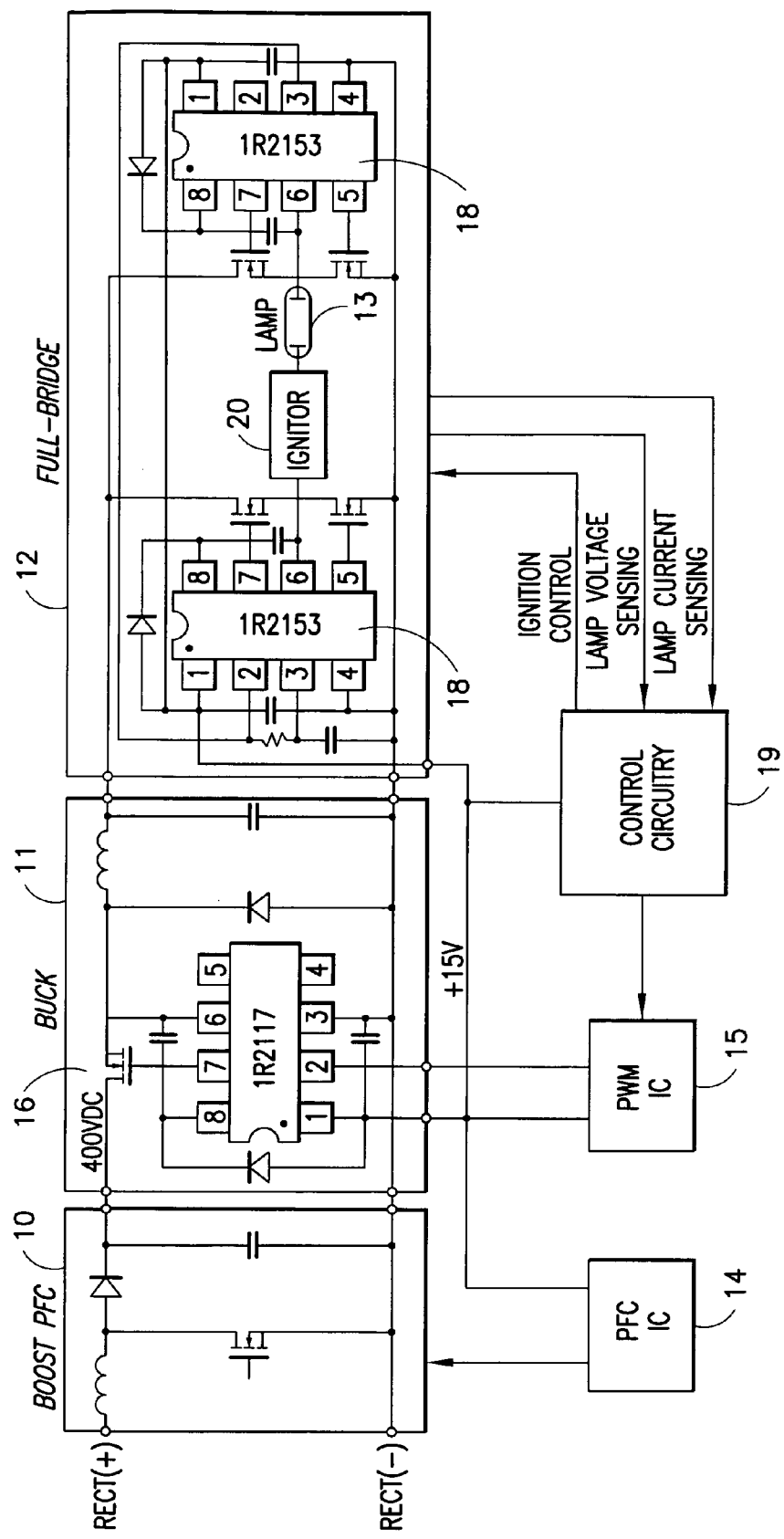
FIG. 1 is a schematic block diagram showing a typical known HID ballast.
Figure 2:
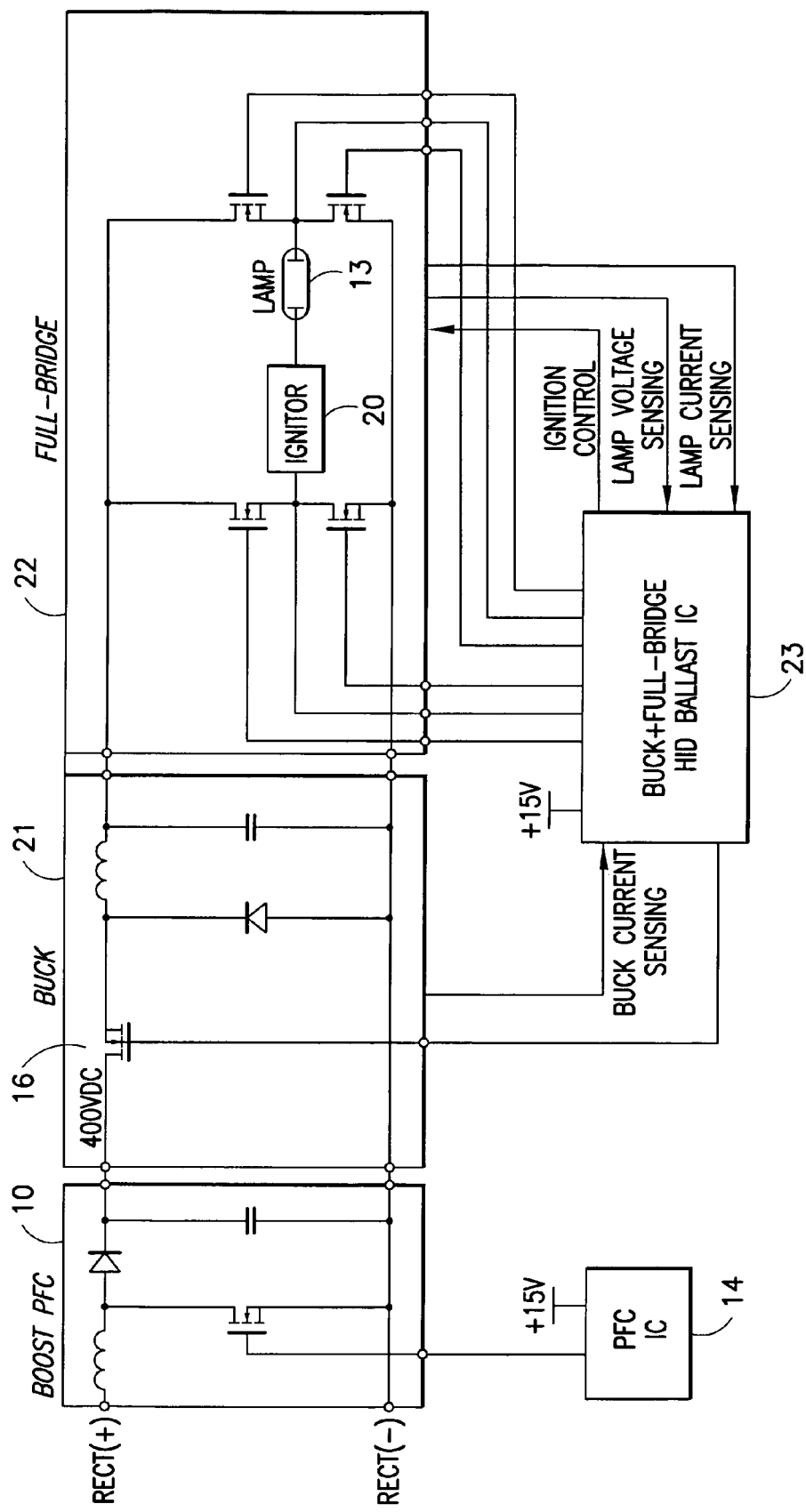
FIG. 2 is a simplified schematic block diagram showing an HID ballast including a control IC according to an embodiment of the invention.

According to an embodiment of the invention, a buck stage 21 and a full-bridge stage 22 are both controlled by combined buck and full-bridge control circuitry in a single control IC 23. This new buck and full-bridge HID ballast IC 23 includes the following basic functions:

1) Complete control for HID lamp ignition, warm-up, running and fault modes.
2) Buck control circuit that can operate in either critical-conduction mode or continuous-conduction mode depending on changing load conditions, and can transition smoothly between the two modes as the changing load conditions occur.
3) Buck instantaneous over-current limitation
4) Buck high-voltage gate driver
5) Full-bridge oscillator
6) Full-bridge high- and low-side gate drivers
7) Ignition on/off timer circuit
8) Lamp voltage sensing
9) Lamp current sensing
10) Internal multiplier for multiplying lamp voltage and lamp current to obtain lamp power.
11) Lamp power feedback circuitry to control the buck on-time to keep the multiplier output equal to an internal reference voltage and thereby regulate the lamp power to a constant level.
12) Lamp current limitation feedback circuitry to control the buck on-time to limit the lamp current sensing input to an internal reference voltage and thereby limit the maximum allowable lamp current level.
13) Fault detection circuitry to detect non-strike, under-voltage and end-of-life lamp fault conditions.
14) Fault logic to safely shut the ballast off should any of these fault conditions occur.
15) Fault counter for counting number of fault occurrences (typically>10,000 events) of a fault occurrence before deactivating the ballast.

Figure 5:
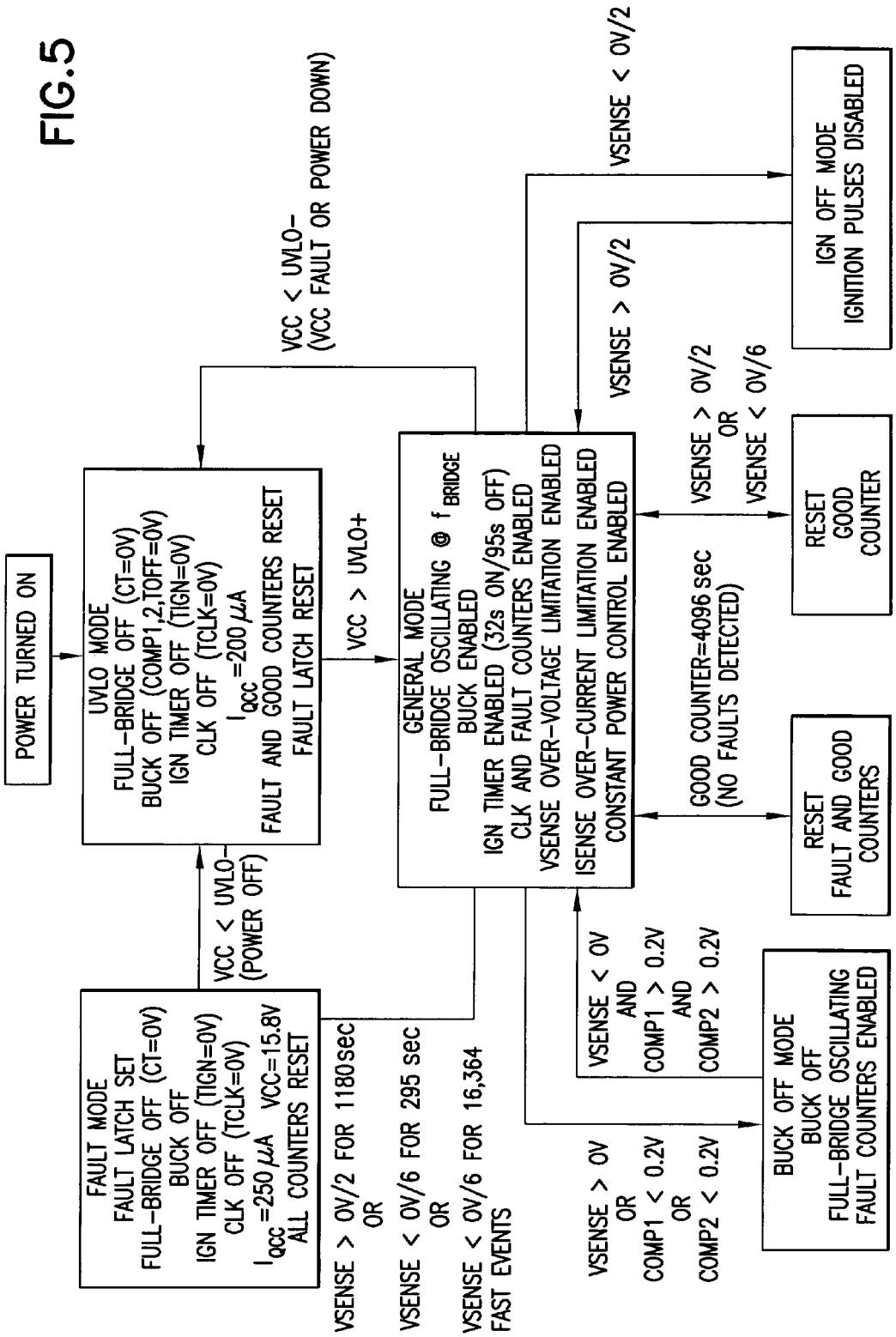
FIG. 5 is a state diagram of the ballast control IC.

16) Programmable fault clock for measuring the elapsed time (typically>5 minutes) of a fault occurrence before deactivating the ballast.
17) Good fault counter for resetting the fault counter should a period of time (typically>1 hour) elapse where no faults have been detected.
18) Complete state diagram in FIG. 5 shows all ballast modes of operation and specific conditions at various pins for transitioning between the different ballast states.

Figure 3A:
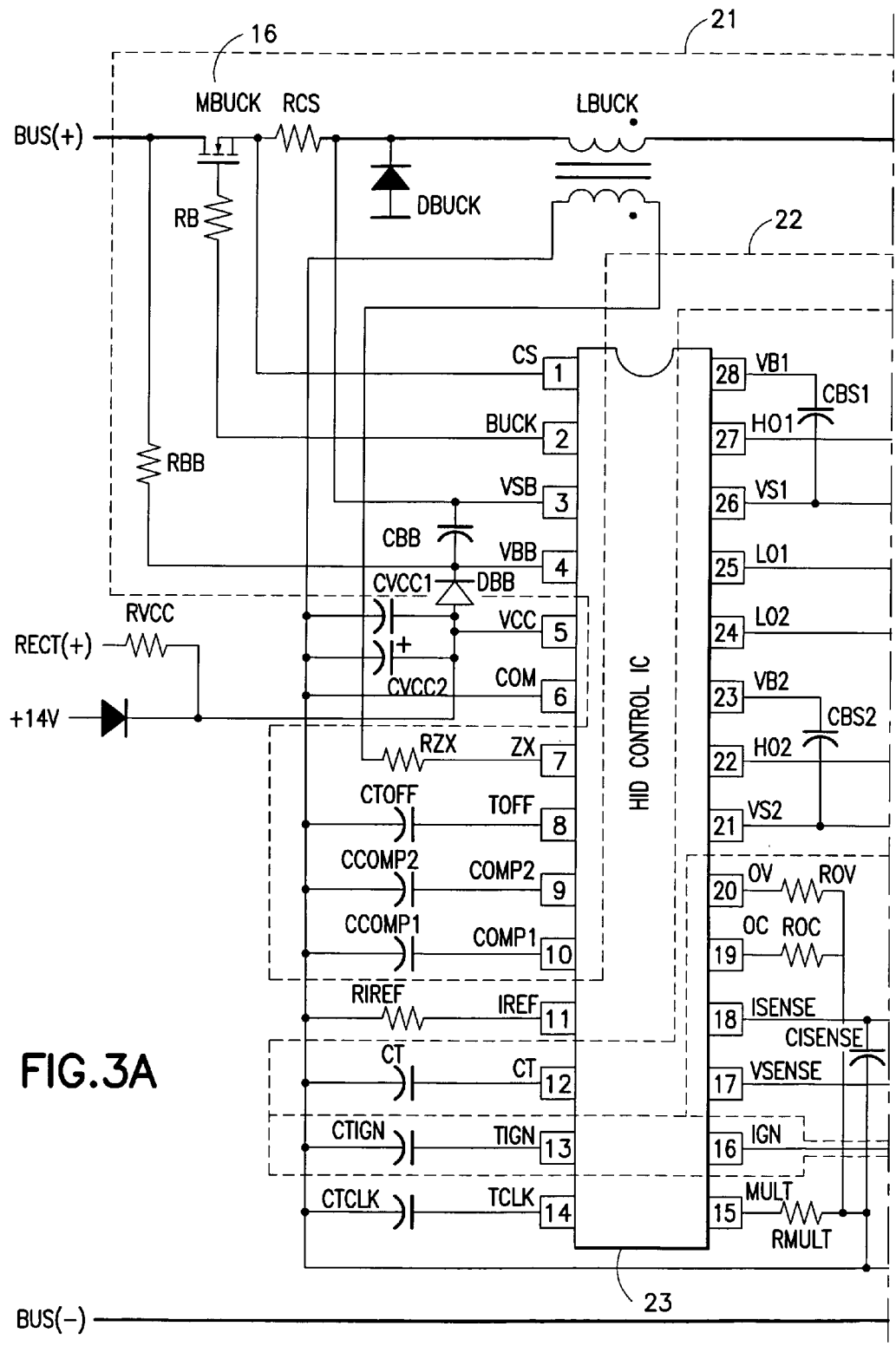
FIG. 3 is a schematic application diagram for the ballast control IC.
Figure 3B:
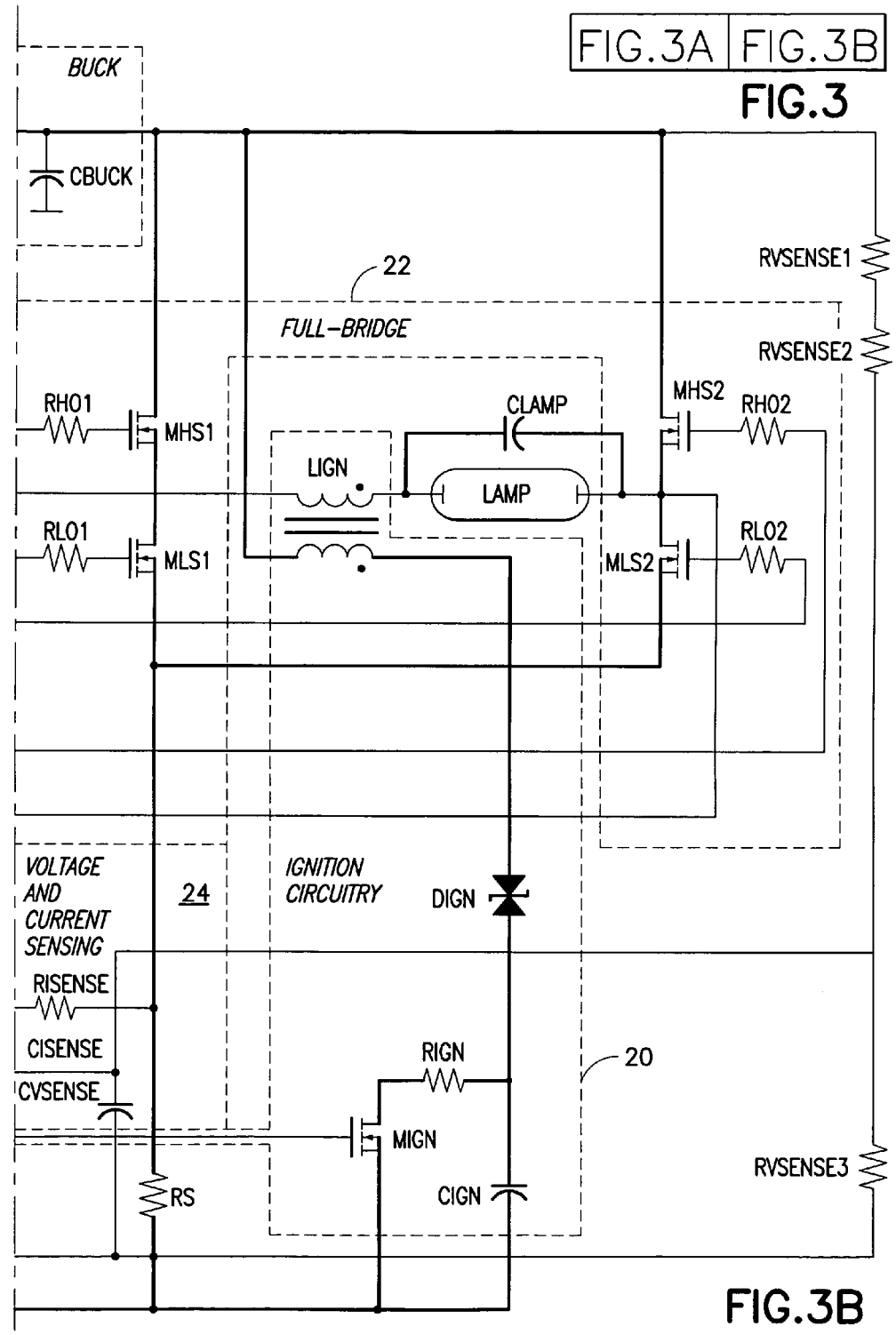

FIG. 3 is an application diagram showing the complete HID control IC 23 as it is connected in the HID ballast system comprising the buck stage 21, full-bridge stage 22 and a voltage and current sensing stage. Selected sections have been highlighted to emphasize each control section of the ballast and the corresponding control pins on the IC.

The buck section 21 includes control pins for high-voltage gate drive for the buck MOSFET 16 (pins BUCK, VBS and VBB), instantaneous current limiting (pin CS), buck off-time for critical-conduction mode (pin ZX), buck maximum off-time for continuous-conduction mode (pin TOFF), buck on-time control for lamp power regulation (pin COMP1) and buck on-time control for maximum lamp current limitation (pin COMP2).

The full-bridge section 22 includes control pins for high-voltage gate drive (pins VB1, HO1, VS1, LO1, LO2, VB2, HO2 and VS2), and full-bridge oscillator frequency control (pin CT).

The ignition control section 20 includes the on/off timer control (pin TIGN) and the output gate drive signal for turning the external ignition circuit on and off (pin IGN).

The voltage and current sensing section 24 includes maximum buck output voltage limitation threshold (pin OV), maximum lamp current limitation threshold (pin OC), and lamp voltage and current sensing for constant power control (pins VSENSE and ISENSE).

Additional pins include pin TCLK for setting the internal fault timer period, pin MULT for setting the internal multiplier gain, and pin IREF for setting an accurate current reference for pins CT, TIGN, TCLK, TOFF, OV and OC.

Figure 4A:
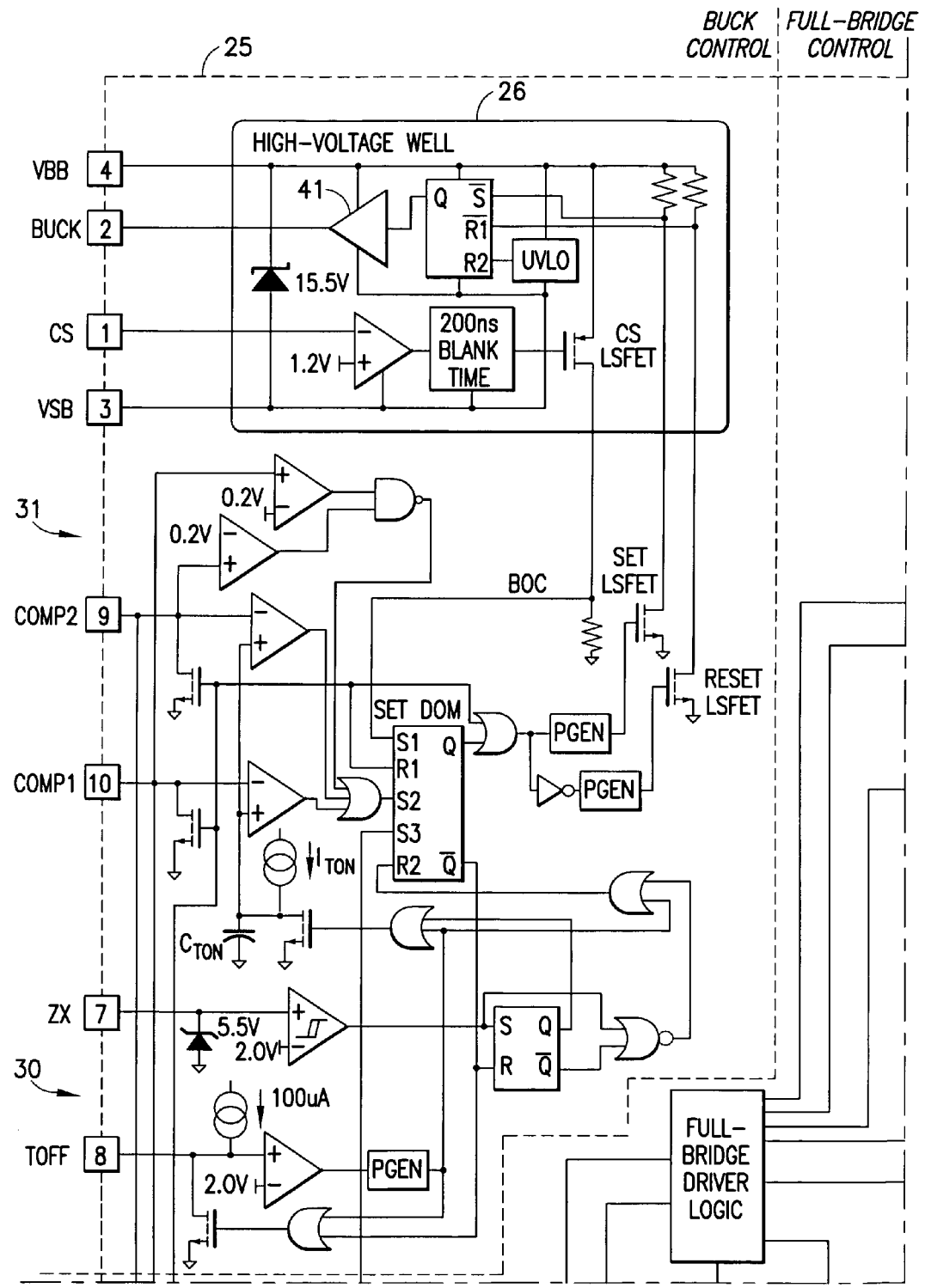
FIG. 4 is a detailed schematic block diagram of the ballast control IC.
Figure 4B:
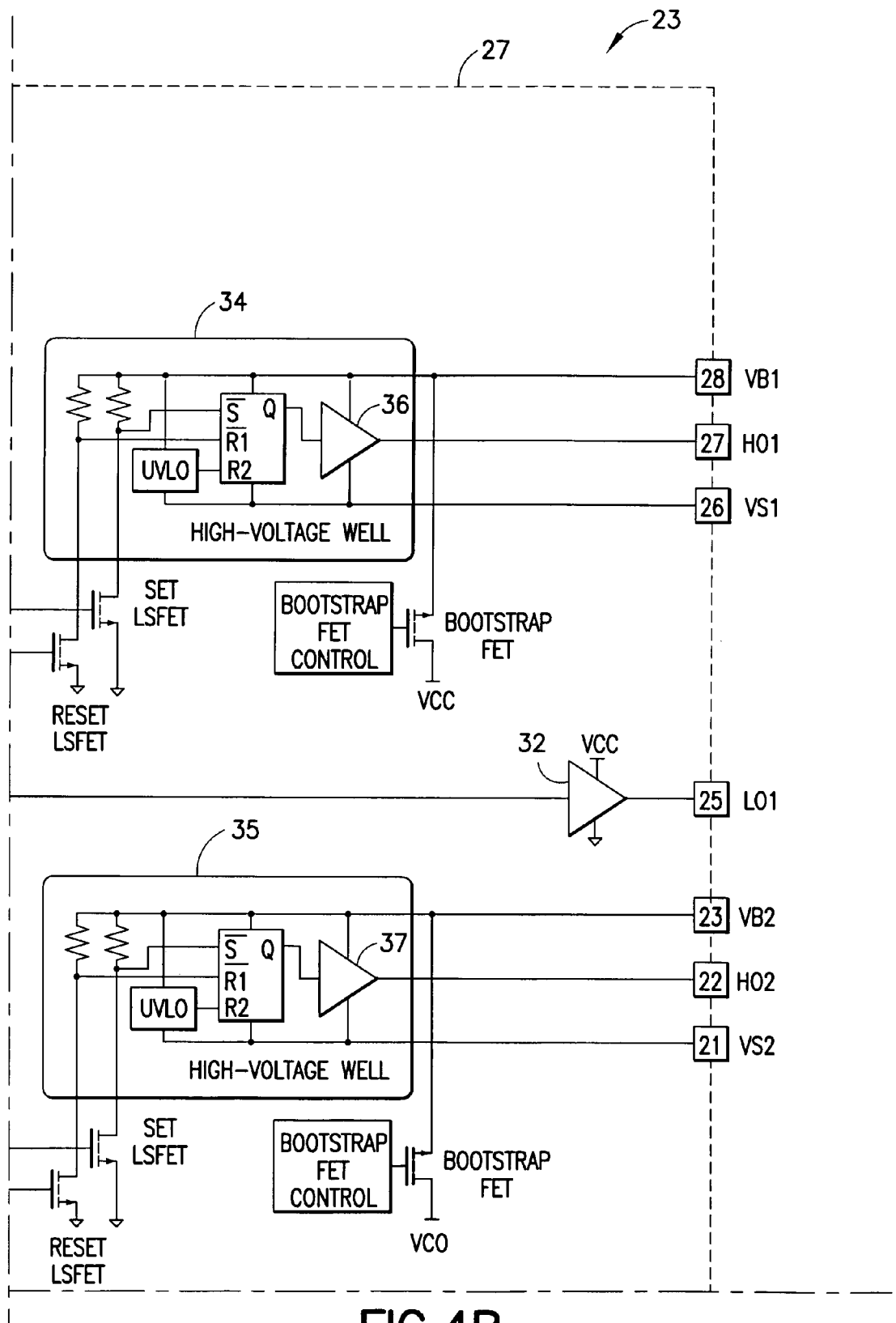
Figure 4C:
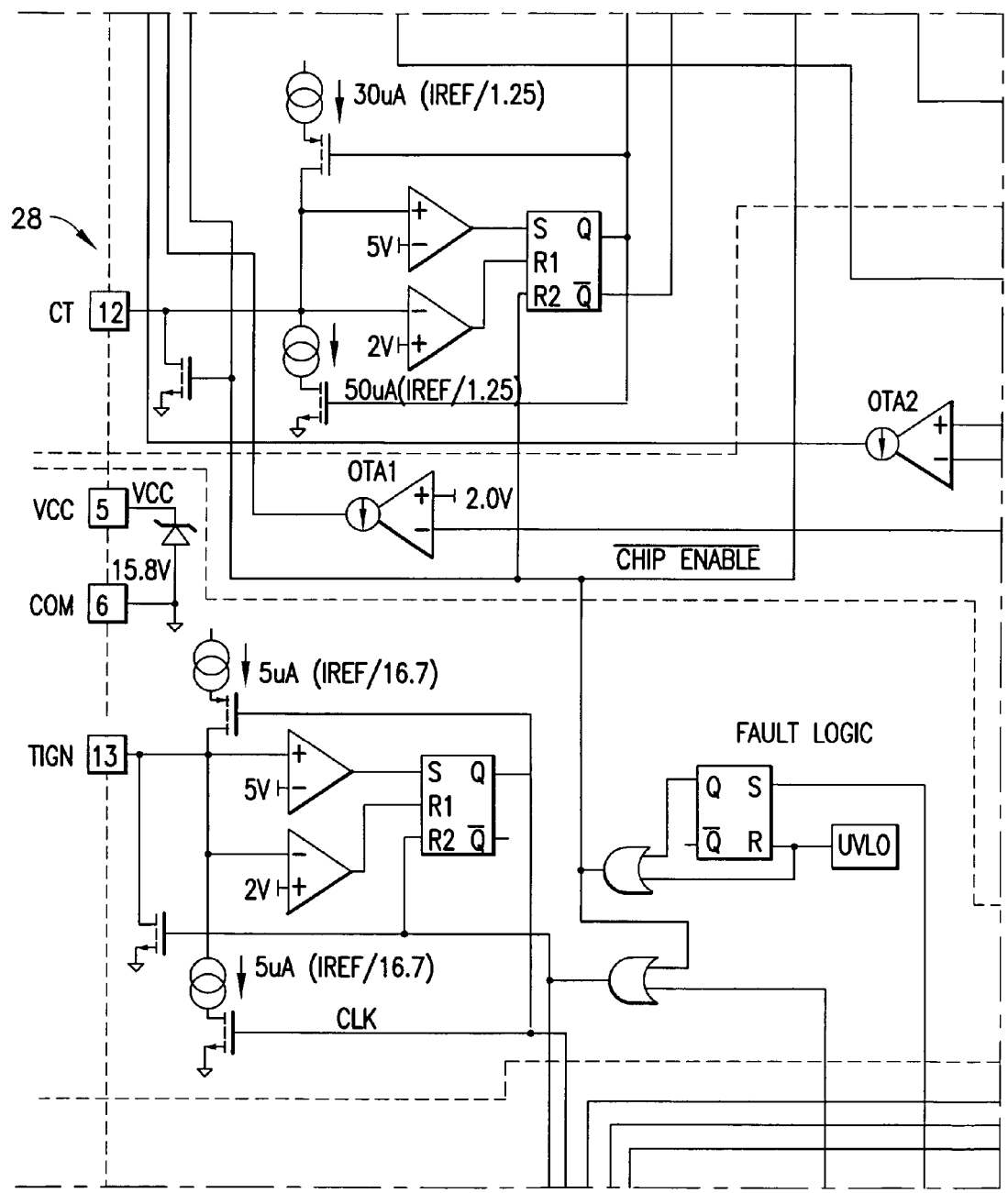
Figure 4D:
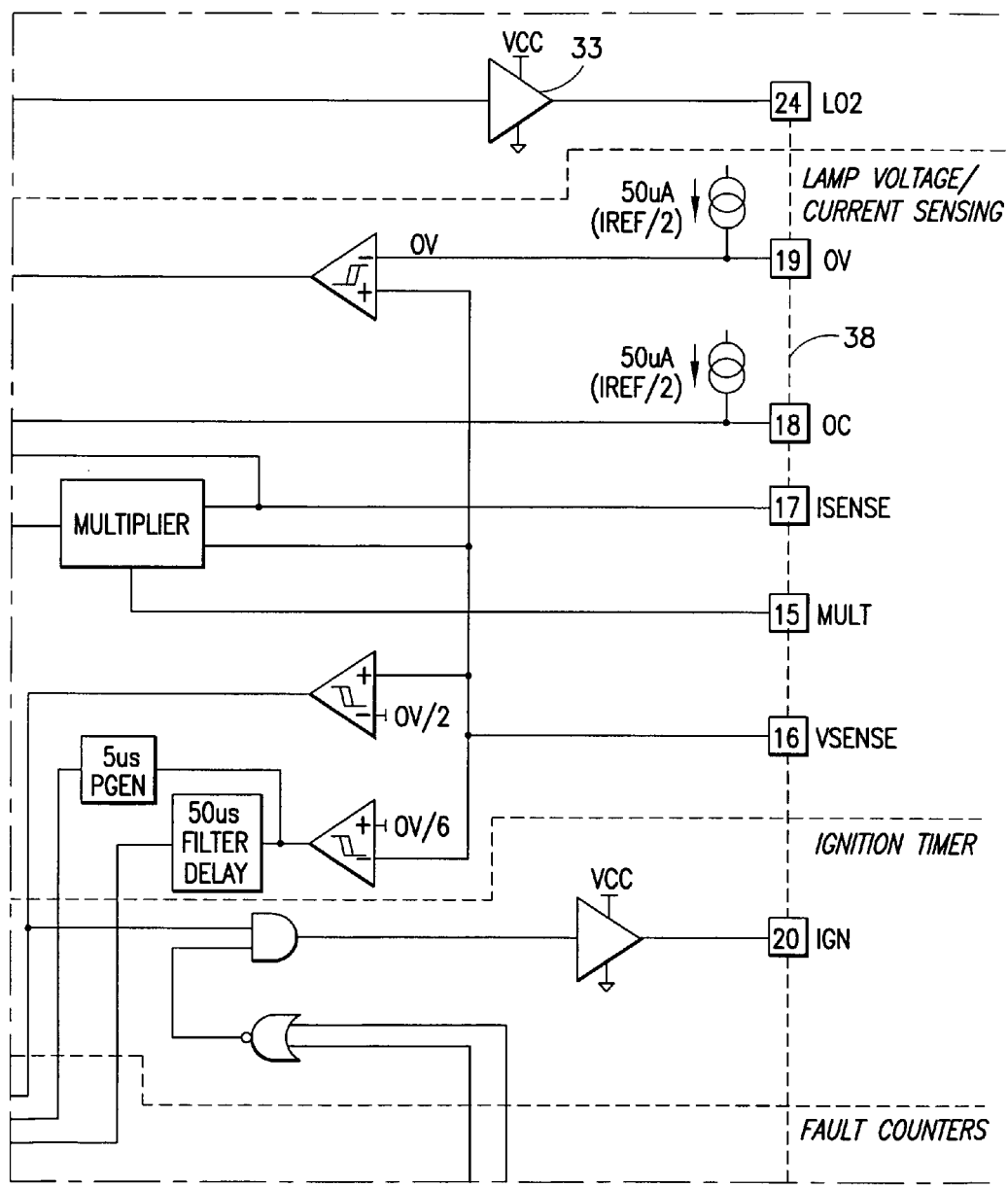
Figure 4E:
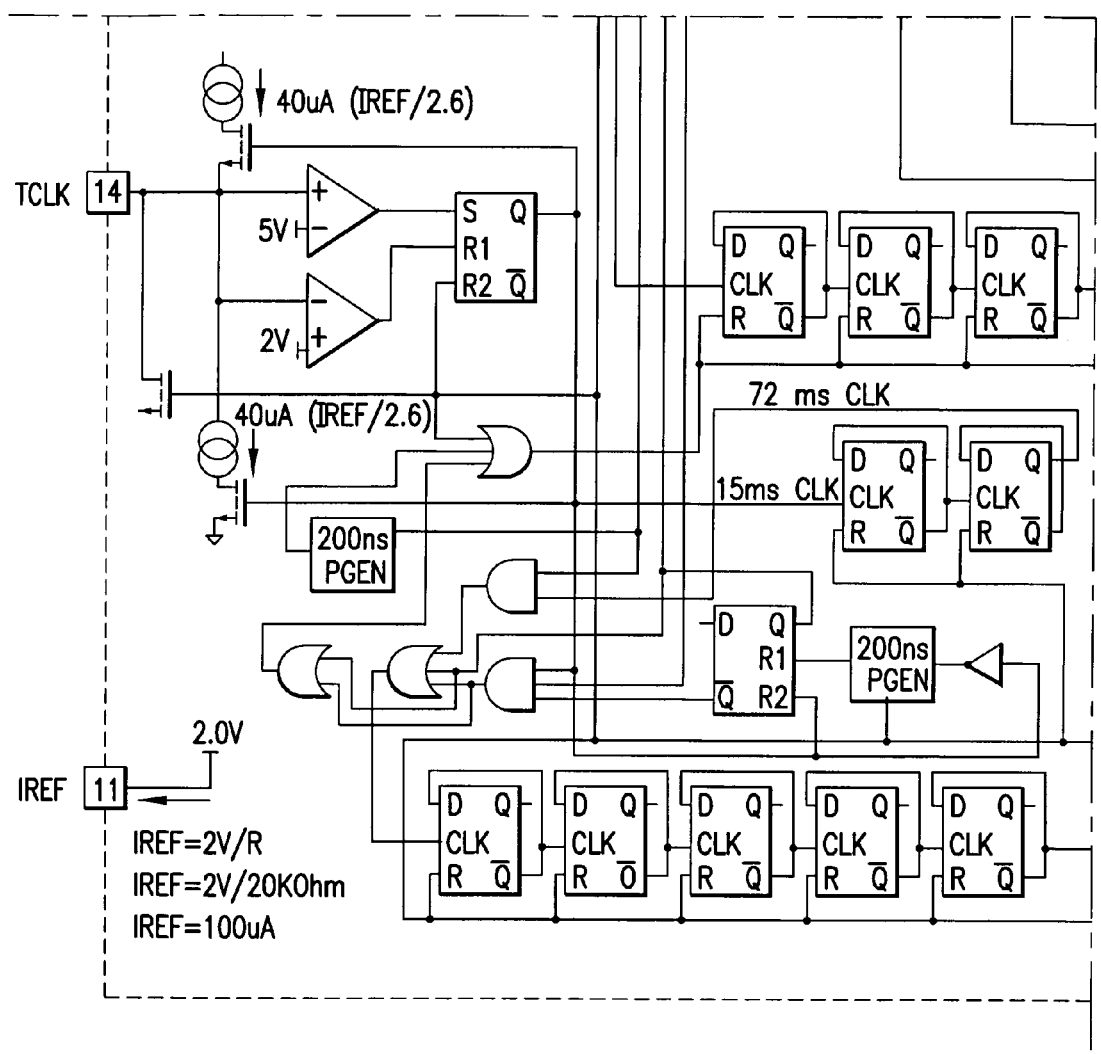
Figures 4, 4F:
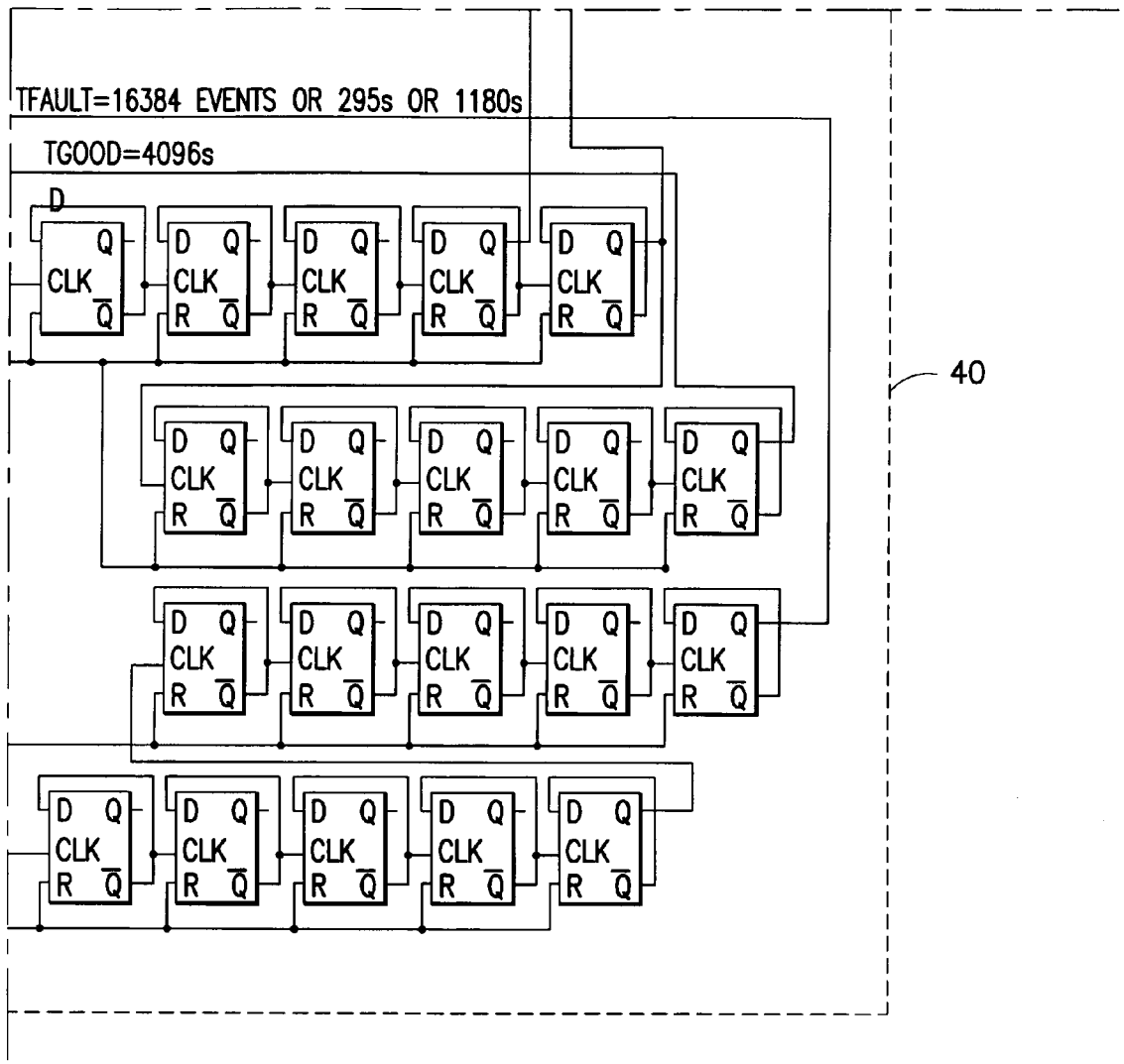

FIG. 4 is a detailed block diagram showing the internal circuitry of the control IC 23. A buck control section 25 includes control logic 30, level-shifting circuitry 31 and a floating high-voltage well 26 to control the buck on-time during critical-conduction or continuous-conduction modes, turn the high-side buck MOSFET 16 on and off, and turn the buck MOSFET 16 off in the event of an over-current condition.

A full-bridge control section 27 includes an externally programmable oscillator 28 for setting the full-bridge frequency, driver logic 29 for generating the internal full-bridge MOSFET on/off control signals, the low-side gate drivers 32, 33 for generating the external on/off low-side full-bridge MOSFETs, and the floating high-voltage wells 34, 35 and gate drivers 36, 37 for generating the external on/off high-side full-bridge MOSFETs.

A lamp voltage and current sensing section 38 includes comparators with programmable thresholds for detecting over-voltage or over-current fault conditions, and a multiplier 39 for multiplying the lamp voltage and current together for regulating lamp power.

Fault counters 40 include an externally programmable clock and several flip-flops for counting the number of fast-occurring under-voltage fault events, or, the time duration of an under- or over-voltage fault condition.

All of these functions are combined inside a single IC for simplifying the ballast system and reducing component count and cost.

Detailed Functional Description

The different modes of the control IC, and how to transition between the modes, are summarized in a standard state diagram (FIG. 5). They include under-voltage lockout (UVLO) mode, general mode and fault mode. Subsets of general mode include buck off mode, reset fault and good counters, reset good counter, and ignition off mode. These modes will be described with reference to FIGS. 3 and 4.

Under-Voltage Lockout (UVLO) Mode

The under-voltage lockout mode (UVLO) is defined as the state the IC is in when VCC (FIG. 3) is below the turn-on threshold of the IC 23. Under-voltage lockout is designed to maintain an ultra-low supply current during UVLO mode of less than 200 uA for reducing power losses across the external start-up resistor, and to guarantee the IC is fully functional before the buck high-side 41 and full-bridge high- and low-side output drivers 32, 33, 36, 37 are activated. The external capacitor CVCC from VCC to COM is charged by a current flowing from the rectified AC line or DC bus through an external supply resistor RVCC minus the micro-power start-up current drawn by the IC. The external start-up resistor RVCC is chosen so that VCC exceeds the IC turn-on threshold at the desired AC line turn-on voltage for the ballast.

Figure 6:
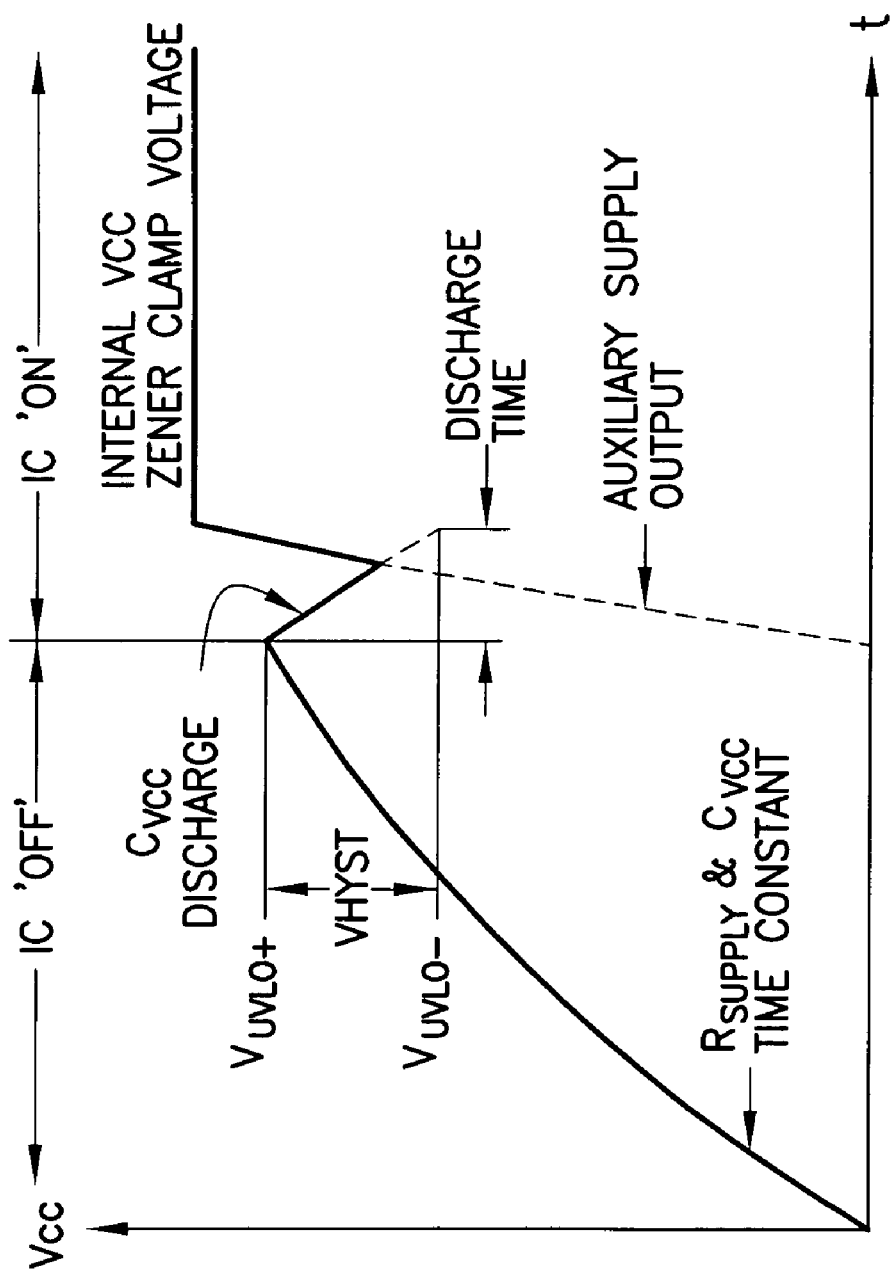

Once the capacitor voltage on VCC reaches the start-up threshold, the IC turns on and the full-bridge oscillator (CT) and gate driver outputs (HO1, LO1, HO2 and LO2) begin to oscillate. The capacitor from VCC to COM begins to discharge due to the increase in IC operating current. An auxiliary supply (secondary winding, charge pump, etc.) should then takes over as the main supply voltage, before VCC discharges to the IC turn-off threshold (FIG. 6) and charges VCC up again to the internal zener clamp diode voltage (15.8V typical). During UVLO mode, the full-bridge and buck are off, the ignition timer and clock are off, the fault and good counters are reset, and the fault latch is reset.

General Mode

The HID control IC enters general mode when VCC exceeds the IC turn-on threshold, UVLO+. The full-bridge begins to oscillate at the frequency programmed by the external capacitor CT on the CT pin. The buck is enabled but only begins to oscillate when the voltages on the COMP1 and COMP2 pins are above 0.2V, and the voltage on the VSENSE pin is below the voltage on the OV pin. The ignition timer is enabled and the IGN pin turns on and off ('high' and 'low') as programmed by the capacitor on the TIGN pin (32s 'on', 96s 'off' typical). The clock is enabled and oscillates at the frequency programmed by the external capacitor on the TCLK pin. Also, the fault counters, the over-voltage protection on the VSENSE pin, the current limitation on the ISENSE pin, and the constant power control are all enabled during general mode.

The subset modes of general mode include buck off, reset fault and good counters, reset good counter, and ignition off.

When the voltage on the COMP1 or COMP2 pin is below 0.2V, the buck control has reached the minimum on-time limit. The IC will enter buck off mode and the buck output will turn off. If the voltage on the VSENSE pin is above the voltage on the OV pin, the buck output voltage has reached the maximum voltage limit (maximum voltage limitation) and the IC will enter buck off mode and the buck output will turn off.

When the voltages on the COMP1 and COMP2 pins increase above 0.2V and the VSENSE pin decreases below the voltage on the OV pin, the IC will re-enter general mode and the buck will re-start. During general mode, the fault counter will count the number of sequential under- or over-voltage faults. If no faults are detected for a long period of time (4096 sec typical), as measured by the good counter, then the fault counter and good counter will both be reset to zero. Also, each time a fault is counted, the good counter is reset to zero.

During general mode, the ignition timer is enabled and the ignition gate driver output (IGN pin) oscillates on and off as programmed by the capacitor on the TIGN pin (32 s on/96 s off typical). This will enable the external lamp ignition circuit to ignite the HID lamp. If the voltage at the VSENSE pin is above one-half of the voltage on the OV pin (OV/2), then the lamp has not yet ignited and the ignition timer will remain enabled. The over-voltage fault counter will count the time during which the over-voltage condition exists (VSENSE>OV/2). If the voltage at the VSENSE pin remains above OV/2 and the over-voltage fault counter times out (1180 sec typical), then the lamp will not ignite due to a lamp non-strike fault condition (end of life, broken glass, etc.) and the IC will enter fault mode and shutdown. If the voltage at the VSENSE pin decreases below OV/2 before the over-voltage fault counter times out, then the lamp has successfully ignited and the IC will remain in general mode and the IGN pin (ignition gate driver output) will be disabled. Once the lamp has ignited, the lamp voltage will decrease sharply to a very low voltage (20V typical). As the lamp warms up, the lamp voltage will slowly increase until the nominal running voltage is reached (100V typical).

If the lamp voltage remains too low for too long, then this is a lamp fault condition and the ballast must shut down. To detect this, the VSENSE pin includes an under-voltage threshold of OV/6. If the voltage at the VSENSE pin remains below OV/6 and the under-voltage fault counter times out (295 sec typical), then the lamp is not warming up properly due to a lamp fault condition (end of life, etc.) and the IC will enter fault mode and shutdown. If the voltage at the VSENSE pin increases above OV/6 before the under-voltage counter times out, then the lamp has successfully warmed up and the IC will remain in general mode.

A fast transient under-voltage detection is also included at the VSENSE pin of the IC. During normal running conditions, fast transient under-voltage spikes can occur on the lamp voltage due to instabilities in the lamp arc. The resulting transients on the VSENSE pin will cycle below and above the OV/6 threshold quickly (<50 us). If the number of events of these transients exceeds the maximum number of events of the fault counter (16,384 events typical), then the IC will enter fault mode and shut down.

During general mode, the constant power control loop will attempt to keep the lamp power regulated to a constant level. However, during lamp warmup, the lamp voltage is very low which will result in a high current in the lamp. If the lamp current exceeds the maximum rating of the lamp, then the ISENSE pin will exceed the voltage programmed on the OC pin. This will cause the current limitation circuit to decrease the COMP2 voltage to decrease the buck on time. This will decrease the lamp current and keep it regulated at the maximum limit as programmed by the voltage on the OC pin. As the lamp warms up, the lamp voltage will increase and the lamp current will decrease. The ISENSE pin will decrease below the current limitation threshold on the OC pin and the IC will continue to control the buck on time to keep the lamp power constant.

In summary, the IC reacts to the different load conditions (open-circuit, short-circuit, lamp warm-up, constant power running, slow under-voltage lamp faults, fast under-voltage faults, over-voltage lamp faults, lamp non-strike, etc.) by turning the buck on or off, adjusting the buck on-time, or counting the occurrence of the different faults and shutting down the IC. The IC senses the different load conditions at the VSENSE and ISENSE pins, compares the voltages at these pins against a set of programmed thresholds, and determines the correct operating mode of the IC.

Figure 7:
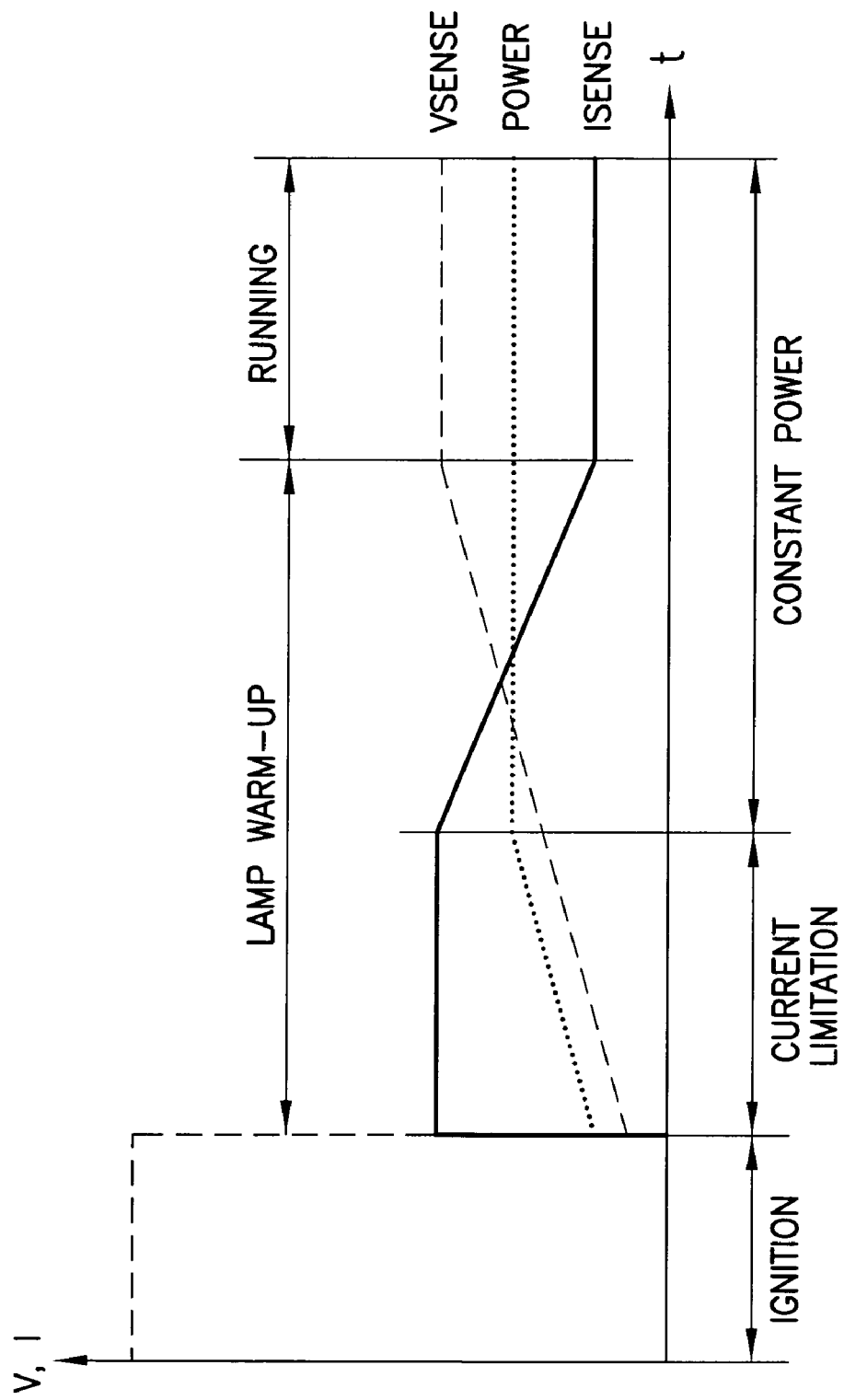
FIG. 7 is a graph showing VSENSE and ISENSE pins during ignition, warm-up and running modes.

The typical voltage levels at the VSENSE and ISENSE pins and the corresponding operating modes have been plotted versus time (FIG. 7) to further show how the IC controls an HID lamp load during ignition, warm-up, running and fault conditions.

Buck Control

The buck control circuit 25 has the ability to operate in critical-conduction mode or continuous-conduction mode depending on the level of current flowing through the buck MOSFET 16. This current is detected by placing a current sensing resistor RCS in series with the buck MOSFET and the resulting voltage across the current sensing resistor is measured at the CS pin. During normal lamp running conditions, the voltage across the buck current sensing resistor RCS is below the internal over-current threshold (1.25V typical). The buck on-time is defined by the time it takes for the internal on-time capacitor CTON to charge up to the voltage level on the COMP1 pin. During the on-time, the current in the buck inductor LBUCK charges up to some peak level, depending on the inductance value, and the secondary winding output of the buck inductor is at some negative voltage level, depending on the ratio between the primary and secondary windings. The secondary winding output is measured by the ZX pin, which clamps the negative voltage to a diode drop below COM using an internal ESD diode, and limits the resulting negative current flowing out of the pin with an external resistor, RZX.

When the voltage on the internal on-time capacitor CTON exceeds the voltage on the COMP1 pin, the on-time has ended and the buck output turns off. The secondary winding output of the buck inductor LBUCK transitions to some positive voltage level, depending on the ratio between the primary and secondary windings, and causes the ZX pin to exceed the internal 2V threshold. The current in the buck inductor LBUCK begins to discharge into the lamp full-bridge output stage. When the inductor current reaches zero, the ZX pin decreases back below the 2V threshold. This causes the internal logic of the buck control to start the on-time cycle again.

Figure 8:
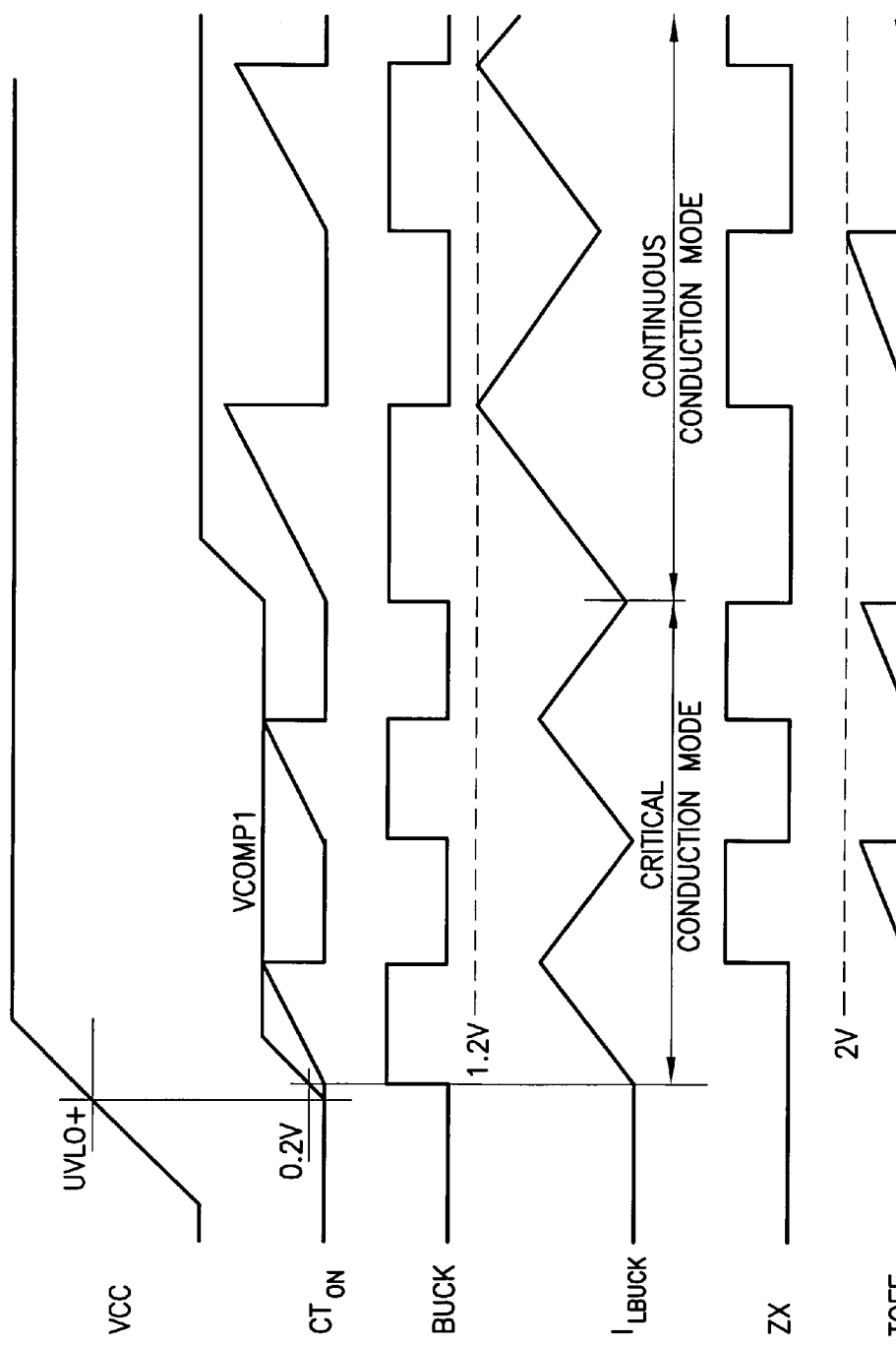
FIG. 8 is a graph showing buck timing.

This mode of operation is known as critical-conduction mode because the buck MOSFET is turned on each cycle when the inductor current discharges to zero. The on-time is programmed by the voltage level on the COMP1 pin, and the off-time is determined by the time it takes for the inductor current to discharge to zero, as measured by a negative-going edge on the ZX pin (FIG. 8). The resulting shape of the current in the inductor is triangular with a peak value determined by the inductance value and on-time setting.

During lamp warm-up or a short-circuit condition at the output, the inductor current will charge up to an excessive level that can saturate the inductor or damage the buck MOSFET. To prevent this condition, the buck current sensing resistor is set such that the voltage at the CS pin exceeds the internal over-current threshold (1.25V typical) before the inductor saturates. Should the CS pin exceed 1.25V before the internal on-time capacitor reaches the voltage level on the COMP1 pin, the on-time will end and the buck output will turn off. The off time is determined by a negative-going edge on the ZX pin, or, if the maximum off time is reached as programmed by the time it takes for the external capacitor on the TOFF pin to charge up to an internal threshold of 2V. If the maximum off time is reached before the inductor current discharges to zero, then the inductor will begin charging again from some value above zero.

This mode of operation is known as continuous-conduction mode and results in a continuous DC current in the inductor with a ripple bounded above by the over-current threshold and below by the maximum off time setting. Continuous-conduction mode also allows for a higher average current to flow through the buck inductor before saturation occurs than with critical-conduction mode.

Constant Power Control

During the general mode of operation and after the lamp has ignited, the IC regulates the lamp output power to a constant level. To achieve this, the IC measures the lamp voltage and lamp current at the VSENSE and ISENSE pins, multiplies the voltage and current together using an internal multiplier circuit 39 to calculate power, and regulates the output of the multiplier circuit to a constant reference voltage by increasing or decreasing the buck on-time. If the lamp power is too low then the output of the multiplier will be below the internal reference voltage. The operational transconductance amplifier (OTA1) will output a sourcing current to the COMP1 pin that will charge up the external capacitor CCOMP1 to a higher voltage. This will increase the on-time of buck and increase the output current to the lamp for increasing the output power. If the lamp power is too high, then the opposite will occur. The OTA1 will output a sinking current to the COMP1 pin that will discharge the external capacitor CCOMP1 to a lower voltage. This will decrease the buck on-time and decrease the output current to the lamp for decreasing the output power. The speed of the constant power control loop is set by the value of the external capacitor CCOMP1 at the COMP1 pin that determines how fast the loop will react and adjust the buck on-time over the changing load conditions.

Current Limitation Control

The constant power control loop will increase or decrease the buck current for maintaining constant power in the lamp load. During lamp warm-up, the lamp voltage can be very low (20V typical) and the constant power loop will attempt to increase the buck current to several amps of current to maintain constant power. This high current can exceed the manufacturer's maximum current rating for the HID lamp. To prevent this condition, an additional current limitation control loop has been included in the IC. Should the voltage at the ISENSE pin exceed the voltage level at the OC pin, another OTA2 will sink current from the COMP2 pin. When the COMP2 pin voltage decreases below the COMP1 pin voltage, then the current limitation loop will override the constant power loop and the COMP2 pin will decrease the buck on-time. The lower of the COMP1 or COMP2 pins will override the other and control the buck on-time. When the lamp eventually warms up and the lamp voltage increases to a level where the lamp current is below the maximum allowable limit (FIG. 7), then the COMP2 pin voltage will increase above the COMP1 pin voltage, and the COMP1 pin will control the buck on-time again for maintaining constant power.

Full-Bridge Control

The control IC includes a complete high- and low-side full-bridge driver 27 for driving the HID lamp with an AC voltage. The full-bridge driver is typically driven at a frequency of 200 Hz to prevent acoustic resonances from damaging the lamp. The full-bridge frequency is programmed with the external capacitor at the CT pin. The full-bridge begins oscillating at the programmed frequency immediately when the IC comes out of UVLO and turns on. The full-bridge turns off only when the IC enters fault mode or UVLO mode.

During ignition, very high and fast voltage pulses (5 KV, 2 us) are being delivered across the lamp from the external ignition circuit. These ignition pulses can cause high dV/dt transients that can damage the IC, to occur at one or both half-bridge mid-points of the full-bridge driver during the dead-time. During the dead-time, all full-bridge MOSFETs are 'off' and the mid-points of each half-bridge are floating or unbiased. This makes them very susceptible to transients that can cause the mid-points to slew high or low very quickly such that the dV/dt rating of the IC is exceeded. To prevent this, internal logic provides that the IGN pin is set to a logic 'low' during the dead-time. No ignition pulses can occur until the dead-time has ended and the appropriate full-bridge MOSFETs are turned on. This will provide that the mid-points are biased to the output voltage of the buck or COM before an ignition pulse occurs.

Key Points of the Control IC

1) Combination of buck control, buck high-side gate driver, full-bridge control and full-bridge high- and low-side gate drivers in a single IC.
2) Multi-mode buck controller that can transition smoothly between continuous-conduction mode and critical-conduction modes, depending on the load conditions.
3) Constant power control loop that measures lamp voltage and current, multiplies the lamp voltage and current together to obtain a measurement of lamp power, and regulates the measurement of lamp power to a constant reference by adjusting the buck on-time.
4) Current limitation loop that measures lamp current and limits the lamp current measurement to a maximum value by adjusting the buck on-time.
5) Two control loops, constant power control and current limitation, that work together simultaneously to control the buck on-time and transition between one another smoothly depending on the load condition. The lower of the resulting on-times from the two loops overrides the other to control the buck on-time.
6) Instantaneous buck over-current protection to prevent saturation of buck inductor current.
7) An ignition timer for turning the external lamp ignition circuit on and off for a programmed time period, and to turn-off the ignition circuit during the dead-time of the full-bridge switching to prevent the ignition pulse from causing high dV/dt transients at one or both half-bridge mid-points of the full-bridge driver.
8) An over-voltage fault detection and counter to count the time or number of events of an over-voltage condition and shutdown the IC when a maximum time or number of events of the fault condition has been exceeded.
9) An under-voltage fault detection and counter to count the time or number of events of an under-voltage condition and shutdown the IC when a maximum time or number of events of the fault condition has been exceeded.
10) A good counter to measure the time between faults and to reset the fault counter when a time duration has exceed a maximum programmed time where no over- or under-voltage faults have occurred.
11) A complete state diagram including UVLO, general and fault modes, and defined conditions at the different IC pins for transitioning between each mode.

Although the present invention has been described in relation to particular embodiments thereof, many other variations and modifications and other uses will become apparent to those skilled in the art. Therefore, the present invention is not limited by the specific disclosure herein.

What is claimed is:

1. A single-chip IC controller for an electronic ballast for driving high intensity discharge (HID) lamp:
   said single chip IC controller being connected for controlling both a buck stage and a switching stage in said electronic ballast;
   the buck stage having a buck MOSFET controlling current to a buck inductor, receiving a DC input voltage and outputting a DC voltage with controlled current; and
   the switching stage converting said DC output voltage to a switched AC voltage which is capable of driving said HID lamp;
   wherein said controller controls said buck MOSFET in response to buck inductor current; and
   wherein said buck stage is controlled to operate in either:
   a critical-conduction mode wherein said buck inductor current does not exceed a predetermined level, and in response thereto, said buck MOSFET is turned on according to a predetermined on-time, and following said predetermined on-time said buck inductor current discharges to zero into said switching stage, and in response thereto, said predetermined on-time is restarted, or
   a continuous-conduction mode wherein said buck inductor current exceeds a predetermined level, in response to which said buck MOSFET is turned off prior to the end of said predetermined on-time, whereupon said inductor current discharges into said switching stage, and following a predetermined off-time, said buck MOSFET is restarted independently of whether said inductor current has reached zero or is above zero, and
   to transition smoothly between said modes.

2. A method of controlling an electronic ballast for driving a high intensity discharge (HID) lamp, said electronic ballast comprising:
   a buck stage having a buck MOSFET controlling current to a buck inductor, for receiving a DC input voltage and outputting a DC voltage with controlled current; and
   a switching stage for converting said DC output voltage to a switched AC voltage which is capable of driving an HID lamp; said method comprising the steps of:
   providing a single chip IC controller, coupling said single chip IC controller to both said buck stage and said switching stage, and controlling both the buck stage and the switching stage with said single chip IC controller;
   wherein said controller controls said buck MOSFET in response to buck inductor current; and
   wherein said buck stage is controlled to operate in either:
   a critical-conduction mode wherein said buck inductor current does not exceed a predetermined level, and in response thereto, said buck MOSFET is turned on according to a predetermined on-time, and following said predetermined on-time said buck inductor current discharges to zero into said switching stage, and in response thereto, said predetermined on-time is restarted, or
   a continuous-conduction mode wherein said buck inductor current exceeds a predetermined level, in response to which said buck MOSFET is turned off prior to the end of said predetermined on-time, whereupon said inductor current discharges into said switching stage, and following a predetermined off-time, said buck MOSFET is restarted independently of whether said inductor current has reached zero or is above zero, and
   to transition smoothly between said modes.

3. A method of controlling an electronic ballast for driving a high intensity discharge (HID) lamp, said electronic ballast comprising:
   a buck stage having a buck MOSFET controlling current to a buck inductor, for receiving a DC input voltage and outputting a DC voltage with controlled current; and
   a switching stage for converting said DC output voltage to a switched AC voltage which is capable of driving an HID lamp; said method comprising the steps of:
   providing a single chip IC controller, coupling said single chip IC controller to both said buck stage and said switching stage, and controlling both the buck stage and the switching stage with said single chip IC controller;
   wherein said controller has a first control loop which senses voltage and current at said HID lamp and thereby determines lamp power, compares said lamp power to a power reference and in response controls buck MOSFET on-time and lamp current to regulate said lamp power; and
   a second control loop that determines whether said lamp current exceeds a predetermined level and if so, overrides the first control loop and decreases buck MOSFET on-time to thereby decrease lamp current,
   wherein said first control loop multiplies said voltage and current to determine said lamp power.

4. The method of claim 2 or claim 3, wherein said controller senses current at said HID lamp and compares said current to a current reference and in response controls buck MOSFET on-time to limit said lamp current.

5. The method of claim 2 or claim 3, wherein said electronic ballast further comprises a PFC circuit arranged for power-factor correcting said DC input voltage and then supplying said DC input voltage to said buck stage.

6. The method of claim 5, wherein said PFC circuit is a boost PFC circuit.

7. A single-chip IC controller for an electronic ballast for driving high intensity discharge (HID) lamp:
   said single chip IC controller being connected for controlling both a buck stage and a switching stage in said electronic ballast;
   the buck stage having a buck MOSFET controlling current to a buck inductor, receiving a DC input voltage and outputting a DC voltage with controlled current; and
   the switching stage converting said DC output voltage to a switched AC voltage which is capable of driving said HID lamp;
   wherein said controller controls said buck MOSFET in response to an operating condition of said HID lamp;
   wherein said controller has a first control loop which senses voltage and current at said HID lamp and thereby determines lamp power, compares said lamp power to a power reference and in response controls buck MOSFET on-time and lamp current to regulate said lamp power; and
   a second control loop that determines whether said lamp current exceeds a predetermined level and if so, overrides the first control loop and decreases buck MOSFET on-time to thereby decrease lamp current.

8. The single-chip IC controller of claim 7,
   wherein said second control loop includes an operational transconductance amplifier for providing rapid response to an overcurrent in said HID lamp.

9. The single-chip IC controller of claim 8, wherein said controller senses current at said HID lamp and compares said current to a current reference and in response controls buck MOSFET on-time to limit said lamp current; and wherein said sensed lamp current is compared to said current reference at said operational transconductance amplifier.

10. The single-chip IC controller of claim 7,
wherein said first control loop comprises an internal multiplier for multiplying said voltage and current to determine lamp power;
wherein said controller compares said lamp power to a power reference and in response controls buck MOSFET on-time to regulate said lamp power.

11. The single-chip IC controller of any one of claims 1-10, wherein said controller senses current at said HID lamp and compares said current to a current reference and in response controls buck MOSFET on-time to limit said lamp current.

12. The single-chip IC controller of any one of claims 1-10, further comprising a PFC circuit arranged for power-factor correcting said DC input voltage and then supplying said DC input voltage to said buck stage.

13. The single-chip IC controller of claim 12, wherein said PFC circuit is a boost PFC circuit.

14. The single-chip IC controller of claim 1 or 10, wherein said controller senses current at said HID lamp and compares said current to a current reference and in response controls buck MOSFET on-time to limit said lamp current; and
wherein said sensed lamp current is compared to said current reference at an operational transconductance amplifier.

15. The single-chip IC controller of claim 10, wherein said lamp power is compared to said power reference at an operational transconductance amplifier.

* * * * *